(12) United States Patent
Zimmerman et al.

(10) Patent No.: US 7,736,048 B2
(45) Date of Patent: Jun. 15, 2010

(54) SEGMENTED AUGER FOR A CONCRETE DISPENSING APPARATUS

(75) Inventors: Melvin M. Zimmerman, Denver, PA (US); Carl S. Martin, East Earl, PA (US); Matthew S. Hildebrand, Ephrata, PA (US)

(73) Assignee: SWA Holding Company, Inc., Wilmington, DE (US)

( * ) Notice: Subject to any disclaimer, the term of this patent is extended or adjusted under 35 U.S.C. 154(b) by 967 days.

(21) Appl. No.: 11/508,062

(22) Filed: Aug. 22, 2006

(65) Prior Publication Data

US 2008/0049543 A1     Feb. 28, 2008

(51) Int. Cl.
  *B01F 15/02*     (2006.01)
  *B01F 7/08*      (2006.01)
(52) U.S. Cl. .................... 366/50; 366/186; 366/293; 366/318
(58) Field of Classification Search ............ 366/331, 366/50, 192, 321, 186, 293, 194, 195, 196, 366/322; 403/353; 464/182
  See application file for complete search history.

(56) References Cited

U.S. PATENT DOCUMENTS

| | | | | |
|---|---|---|---|---|
| 665,262 A * | 1/1901 | Peck | ................... | 198/672 |
| 1,684,919 A * | 9/1928 | Keyser | ................... | 464/178 |
| 2,114,127 A * | 4/1938 | Neuberth | ................... | 403/331 |
| 2,576,177 A * | 11/1951 | Herr | ................... | 366/299 |
| 2,857,185 A * | 10/1958 | Hofer | ................... | 464/182 |
| 3,092,403 A * | 6/1963 | Gerdeman | ................... | 403/331 |
| 3,129,927 A * | 4/1964 | Mast | ................... | 366/157.2 |
| 3,901,483 A * | 8/1975 | Lasar | ................... | 366/193 |
| 4,059,508 A * | 11/1977 | Metsa-Ketela | ................... | 366/322 |
| 4,416,563 A * | 11/1983 | Zemke et al. | ................... | 403/14 |
| 4,579,459 A * | 4/1986 | Zimmerman | ................... | 366/27 |
| 4,751,803 A | 6/1988 | Zimmerman | ................... | 52/414 |
| 4,891,034 A * | 1/1990 | Wilhelmsen | ................... | 464/87 |
| 5,033,608 A * | 7/1991 | Lorimor et al. | ................... | 198/674 |
| 5,055,252 A | 10/1991 | Zimmerman | ................... | 264/263 |
| 5,352,035 A * | 10/1994 | Macaulay et al. | ................... | 366/15 |
| 5,562,360 A * | 10/1996 | Huang | ................... | 403/379.1 |
| 5,656,194 A | 8/1997 | Zimmerman | ................... | 249/160 |
| 5,885,001 A * | 3/1999 | Thomas | ................... | 366/308 |
| 6,494,004 B1 | 12/2002 | Zimmerman | ................... | 52/251 |
| 2008/0049543 A1 * | 2/2008 | Zimmerman et al. | ................... | 366/50 |

* cited by examiner

*Primary Examiner*—Tony G Soohoo
(74) *Attorney, Agent, or Firm*—Miller Law Group, PLLC (57) ABSTRACT

A segmented auger mechanism is mounted in the hopper of a concrete dispensing apparatus used to distribute a hydrated concrete mixture into a horizontally disposed form to manufacture pre-cast concrete structures, such as concrete wall panels used to form a foundation for a residential or commercial building. The auger mechanism is formed of connected segments that can be individually and independently removed from the concrete structure for service and repair. The auger is rotatably supported by a pair of end bearings supported on the opposing end walls of the hopper of the dispensing apparatus, and by at least one interior bearing rotatably supporting a jack shaft having opposing half-round connecting portions for attachment to a corresponding connecting portion on the auger shaft. Removal of a segment of the auger mechanism facilitates the removal of the entire auger mechanism to minimize the down time of the concrete dispensing apparatus.

20 Claims, 10 Drawing Sheets

SEGMENTED AUGER FOR A CONCRETE DISPENSING APPARATUS

FIELD OF THE INVENTION

The present invention relates generally to the formation of pre-cast concrete structures, and, more particularly, to an auger disposed in a dispensing apparatus for distributing concrete mixture into a form corresponding to the pre-cast concrete structure.

BACKGROUND OF THE INVENTION

Pre-cast concrete structures, such as the type disclosed in U.S. Pat. No. 4,751,803, issued to Melvin M. Zimmerman on Jun. 21, 1988, are commonly utilized in the construction of foundation walls for residential and commercial buildings. Improvements to the basic pre-cast process have been made over the years, as are represented in U.S. Pat. No. 5,055,252, issued to Melvin M. Zimmerman on Oct. 8, 1991; in U.S. Pat. No. 5,656,194, granted on Aug. 12, 1997, to Melvin M. Zimmerman; and in U.S. Pat. No. 6,494,004, issued on Dec. 17, 2002, to Melvin M. Zimmerman. In generally terms, the process involves setting up the form with a polystyrene foam bottom and reinforcing members appropriately positioned, then pouring a concrete mixture into the form. After hardening, the side members of the form are stripped away from the now hardened concrete structure and the concrete structure is loaded onto a truck for delivery to the job site to be assembled into a foundation wall with other similar pre-cast structures.

In some instances, openings, such as for windows and doors to be added to the pre-cast concrete structure, are formed as part of the pre-cast concrete form. Concrete mixture is not to be added to the part of the form corresponding to the window or door openings. Similarly, two or more pre-cast concrete structures can be set-up into a single form into which the concrete mixture is to be added. In such situations, a transverse divider is provided between the concrete structures so that the side members and the dividers can be stripped away from the independent hardened concrete structures before shipping.

Once the form is set-up, a concrete mixture is dispensed into the form to fill the form. This process is typically accomplished through conventional chutes or tubular concrete dispensing devices during which the dispensing device is moved back and forth across the form until the form is filled appropriately with concrete mixture, working around any openings that are established within the form. Dispensing the concrete mixture into the form presents an opportunity to improve the process, reduce manufacturing time, decrease costs and improve profits.

A concrete dispensing apparatus, such as is disclosed in co-pending U.S. patent application Ser. No. 11/508,060, entitled "Concrete Dispensing apparatus for Pre-Cast Concrete Forms", preferably has an auger in the hopper to prevent bridging of the concrete mixture within the hopper and to provide an even distribution of the concrete mixture across the entire transverse width of the discharge opening. Operating an auger in a harsh environment, such as for the distribution and conveying of a hydrated concrete mixture, requires frequent maintenance, service and repair of the auger. The time required to service or repair the auger corresponds to down time in the manufacturing of the pre-cast concrete wall panels because the lack of an operable auger prevents the concrete dispensing apparatus from operating.

Accordingly, it would be desirable to provide improvements to the auger that would decrease the time required to service, repair or replace an auger.

SUMMARY OF THE INVENTION

It is an object of this invention to provide an auger configuration for use in a concrete dispensing apparatus that is operable to dispense concrete mixture into a pre-cast concrete structure form.

It is a feature of this invention that the auger is configured in segmented pieces to facilitate the removal of the auger from the concrete dispensing apparatus.

It is an advantage of this invention that the down time of the concrete dispensing apparatus corresponding to the repair and service of the auger is reduced.

It is another feature of this invention that individual segments of the auger structure can be removed independently of the remaining auger structure.

It is another advantage of this invention that a segment of the auger structure can be replaced to permit servicing or repair of the removed auger segment while the concrete dispensing apparatus continues to operate.

It is still another advantage of this invention that the entire auger structure can be easily removed from the concrete dispensing apparatus by first removing an internal segment to allow lateral movement of the remaining auger structure.

It is still another feature of this invention that the auger is supported by a pair of end bearings supported on the end walls of the hopper of the concrete dispensing apparatus, and by at least one interior bearing supported within the hopper cavity.

It is yet another feature of this invention that each interior bearing is formed with a rotatable jack shaft having a half-round connecting portion that is connectable to a corresponding half-round connecting portion on the auger shaft.

It is yet another advantage of this invention that the disconnection of the auger shaft from the jack shaft carried by the interior bearing permits a disassembly of the auger mechanism.

It is a further advantage of this invention that the auger mechanism can be disassembly to permit a quick removal and replacement of the auger mechanism in the concrete dispensing apparatus.

It is still another object of this invention to provide an auger mechanism for use in a concrete dispensing apparatus for use in the manufacture of pre-cast concrete wall panels, which is durable in construction, inexpensive of manufacture, carefree of maintenance, facile in assemblage, and simple and effective in use.

These and other objects, features and advantages are accomplished according to the instant invention by providing a segmented auger mechanism in the hopper of a concrete dispensing apparatus that is used to distribute a hydrated concrete mixture into a horizontally disposed form to manufacture pre-cast concrete structures, such as concrete wall panels that are conventionally used to form a foundation for a residential or commercial building. The auger mechanism is formed of connected segments that can be individually and independently removed from the concrete structure for service and repair. The auger is rotatably supported by a pair of end bearings supported on the opposing end walls of the hopper of the dispensing apparatus, and by at least one interior bearing rotatably supporting a jack shaft having opposing half-round connecting portions for attachment to a corresponding connecting portion on the auger shaft. Removal of a segment of the auger mechanism facilitates the removal of the entire auger mechanism to minimize the down time of the concrete dispensing apparatus.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring now to FIGS. 1-6, an apparatus for dispensing a concrete mixture into a form can best be seen. The apparatus is intended for use in conjunction with forms for making pre-cast concrete structures, such as foundation wall sections that can be transported to a building site and assembled to create a foundation for the residential or commercial building to be constructed. In the forms that are assembled for creating such modular concrete foundation wall panels, openings for doors or windows are required. While the concrete mixture is to be poured generally into the wall panel form, the concrete mixture is not to be poured into the openings that are also configured into the form. The concrete dispenser 10 to be described below is intended to be moved relative to the modular foundation wall panel form to be filled with concrete mixture. The concrete dispenser 10 can be moved relative to the form, or the form can be moved relative to a fixed position concrete dispenser 10. This later configuration is deemed preferable and is the configuration of the invention shown in the drawings.

The concrete dispenser 10 is formed with a frame 11 supporting a hopper 15 having upright walls that define a cavity 16 for receiving and storing on a temporary basis a supply of hydrated concrete mixture for dispensing into a form or mold. The upright walls of the hopper 12 converge toward the bottom of the hopper 12 to form a discharge opening 17 that is significantly narrower than the inlet opening 18 at the top of the hopper 12 into which the hydrated concrete mixture is delivered. The frame 11 can be adapted for movement along a form, such as by having wheels (not shown) that will travel on tracks or the like along a stationary form. In the drawings, the frame 11 is provided with legs 12 that are configured to support the hopper 15 in a stationary manner above the form so that the form can be moved beneath the hopper 15. Preferably, the legs 12 have adjustable feet 14 that can be positionally adjusted, such as by threading into the legs 12, to level the frame 11 at the job site.

Figure 11:
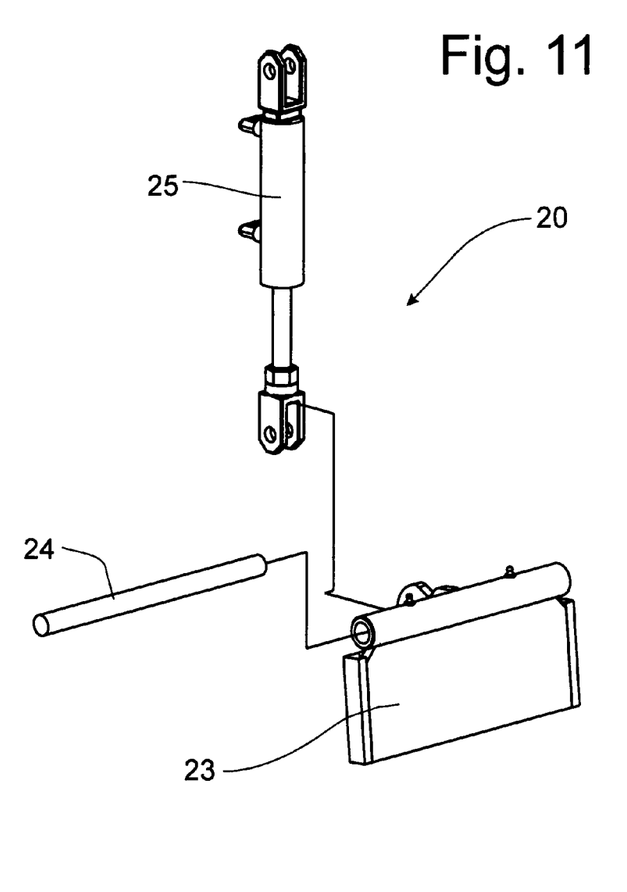
FIG. 11 an enlarged, exploded detail view of the discharge gate.
Figure 12:
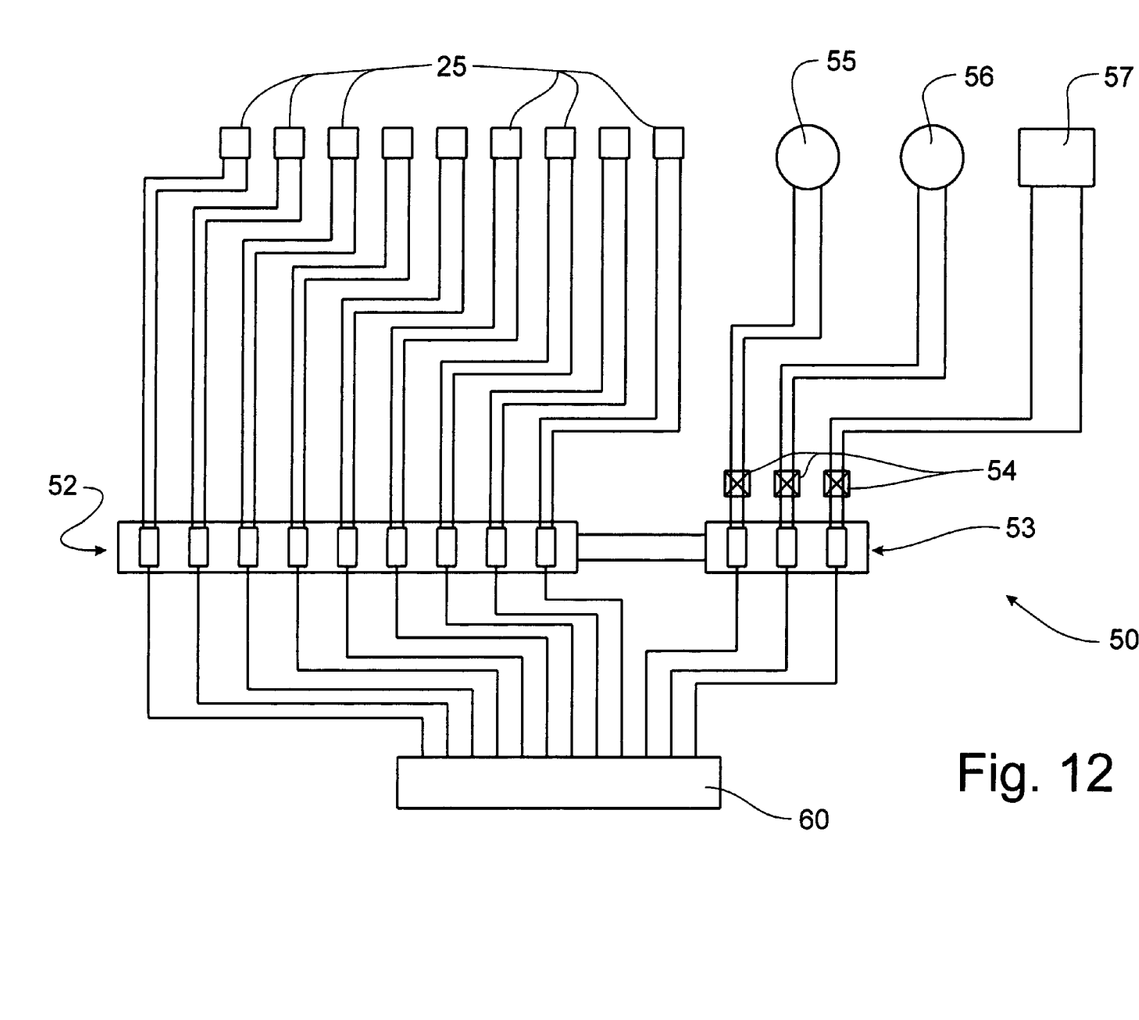
FIG. 12 is a schematic diagram of the hydraulic system powering the operation of the concrete dispensing apparatus.

The hopper 15 has a gate mechanism 20 mounted thereon at the discharge opening 17 so that the discharge of hydrated concrete mixture from the hopper 15 can be selectively controlled. The discharge opening 17 is subdivided into multiple ports 21 and the gate mechanism 20 includes a control gate 22 mounted at each port 21 to be operated independently from each other control gate 22 mounted on the hopper 15. As best seen in FIGS. 11 and 12, each control gate 22 includes a door 23 pivotally mounted on a pivot rod 24 carried by the hopper 15 and a hydraulic actuator mounted on the outside of the hopper 15 and connected to the door 23 to cause pivotal movement thereof in response to extension and contraction of the hydraulic actuator 25. The number, spacing and sizes of the control gates 22 can be configured to the typical pre-cast foundation wall panel that is made during the manufacturing process. As depicted in the drawings, the preferred embodiment is to provide 9 control gates 22 spanning the transverse width of the hopper 15.

Extending forwardly from the transverse ends of the hopper 15 are form vibrators 27 that are positioned to engaged the top and bottom form members, respectively, and transfer thereto a vibratory motion. Preferably, each of the vibrators 27 is extended forwardly of the discharge opening 17 by an arm 28. The purpose of the form vibrators 27 is to induce vibration into the wall panel form to induce air trapped in the concrete mixture being dispensed from the hopper 15 to be released and to slump the concrete mixture within the wall panel form and to evenly distribute the hydrated concrete mixtures throughout the confines of the form.

Preferably, the hopper 15 also supports rearwardly thereof a surface finishing apparatus 30 to work the top surface of the concrete mixture once poured into and distributed within the wall panel form. The finishing apparatus 30 preferably includes a vibratory screed 32 that levels and smoothes the top surface of the concrete mixture. The screed 32 preferably has at least two vibrators 33 mounted thereon for the same purposes as the form vibrators 27, i.e. to encourage trapped air to leave the concrete mixture and to distribute the concrete mixture across the transverse width of the vibratory screed 32. In general structural terms, the screed 32 is a flat panel extending rearwardly of the hopper 15 to engage, level and smooth the concrete mixture dispensed through the discharge opening 17.

Rearwardly of the vibratory screed 32 is a roller trowel 35 to give a final finish to the top surface of the concrete mixture after the screed 32 has performed its respective function. The roller trowel 35 is to further smooth the top surface of the concrete mixture to provide a watery layer, sometimes called the cream, to appear evenly across the surface of the concrete mixture. Preferably, the roller trowel 35 is powered in rotation in opposition to the direction of movement of the forms beneath the concrete dispenser 10. The driving of the rotation of the roller trowel 35 is accomplished through a hydraulic system to be described in greater detail below; however, the outboard end of the roller trowel 35 has a sprocket 37 mounted thereon for operative connection to a drive chain.

Figure 1:
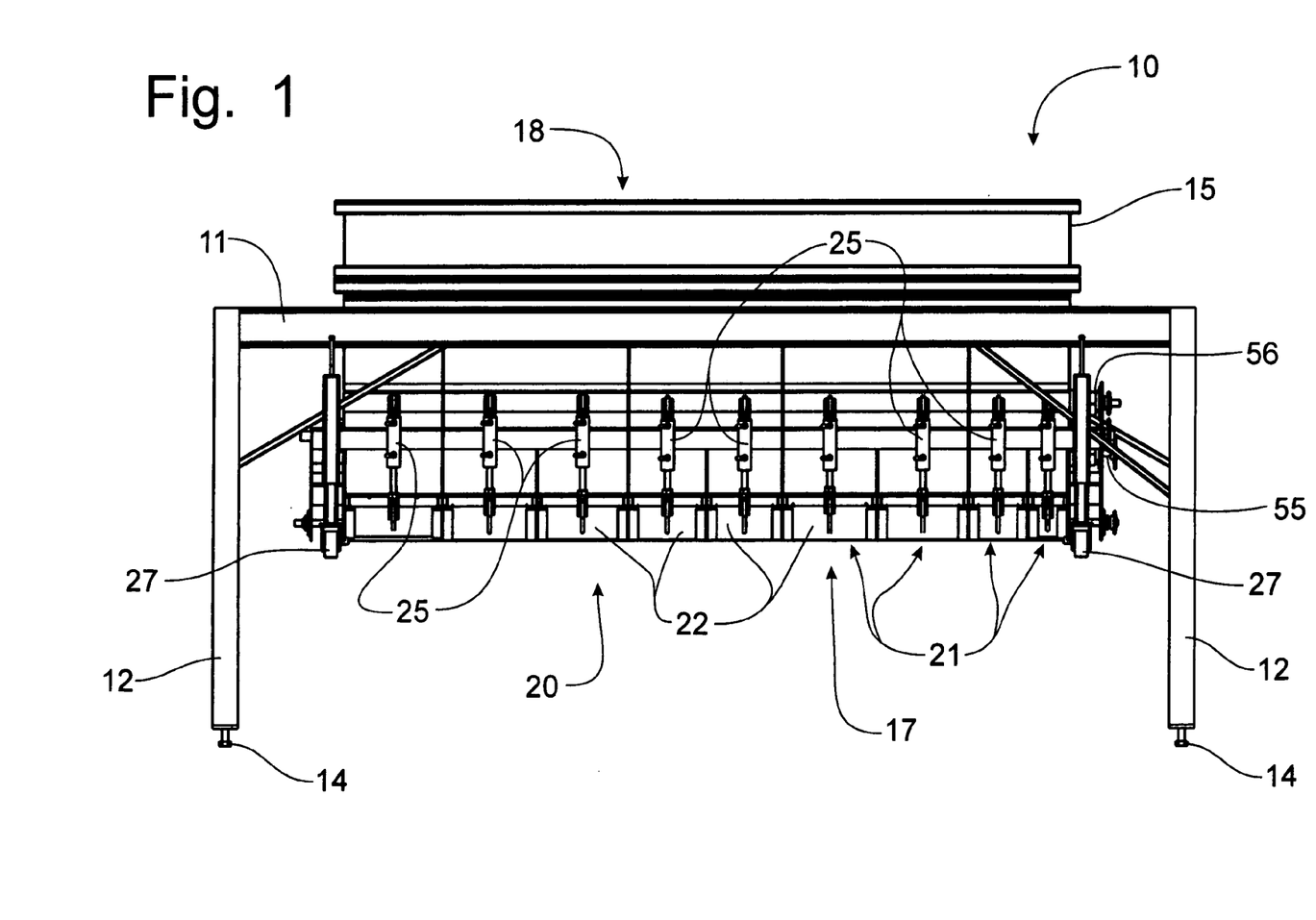
FIG. 1 is a front elevational view of a concrete dispensing apparatus incorporating the principles of the instant invention.
Figure 2:
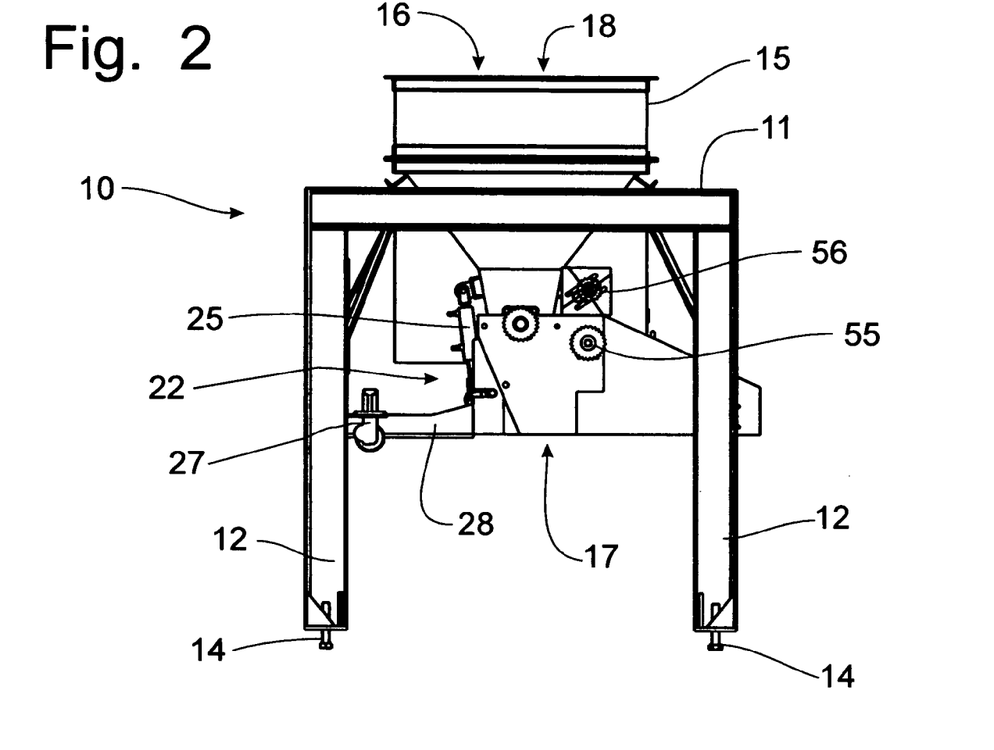
FIG. 2 is a side elevational view of the concrete dispensing apparatus shown in FIG. 1.
Figure 3:
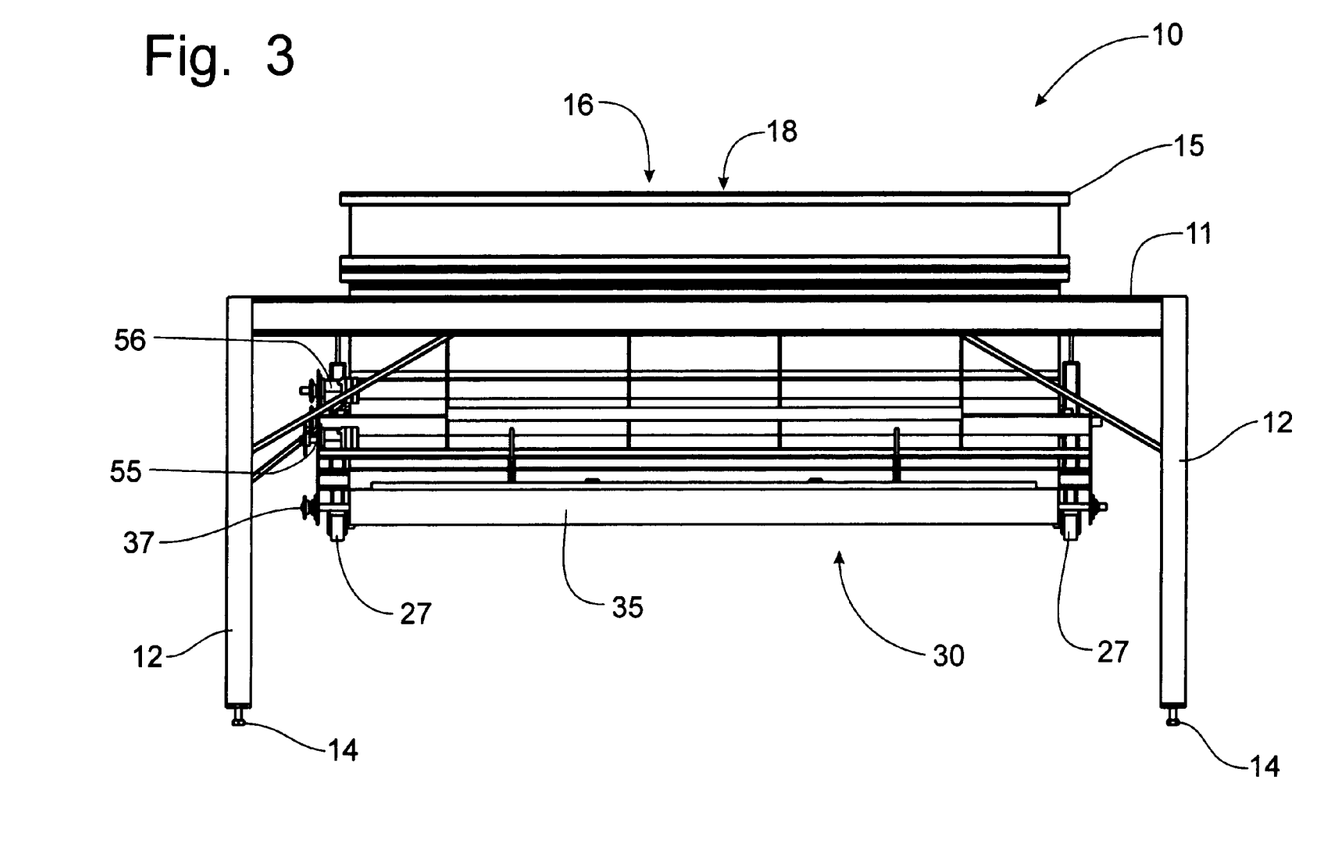
FIG. 3 is a rear elevational view of the concrete dispensing apparatus depicted in FIG. 1.
Figure 4:
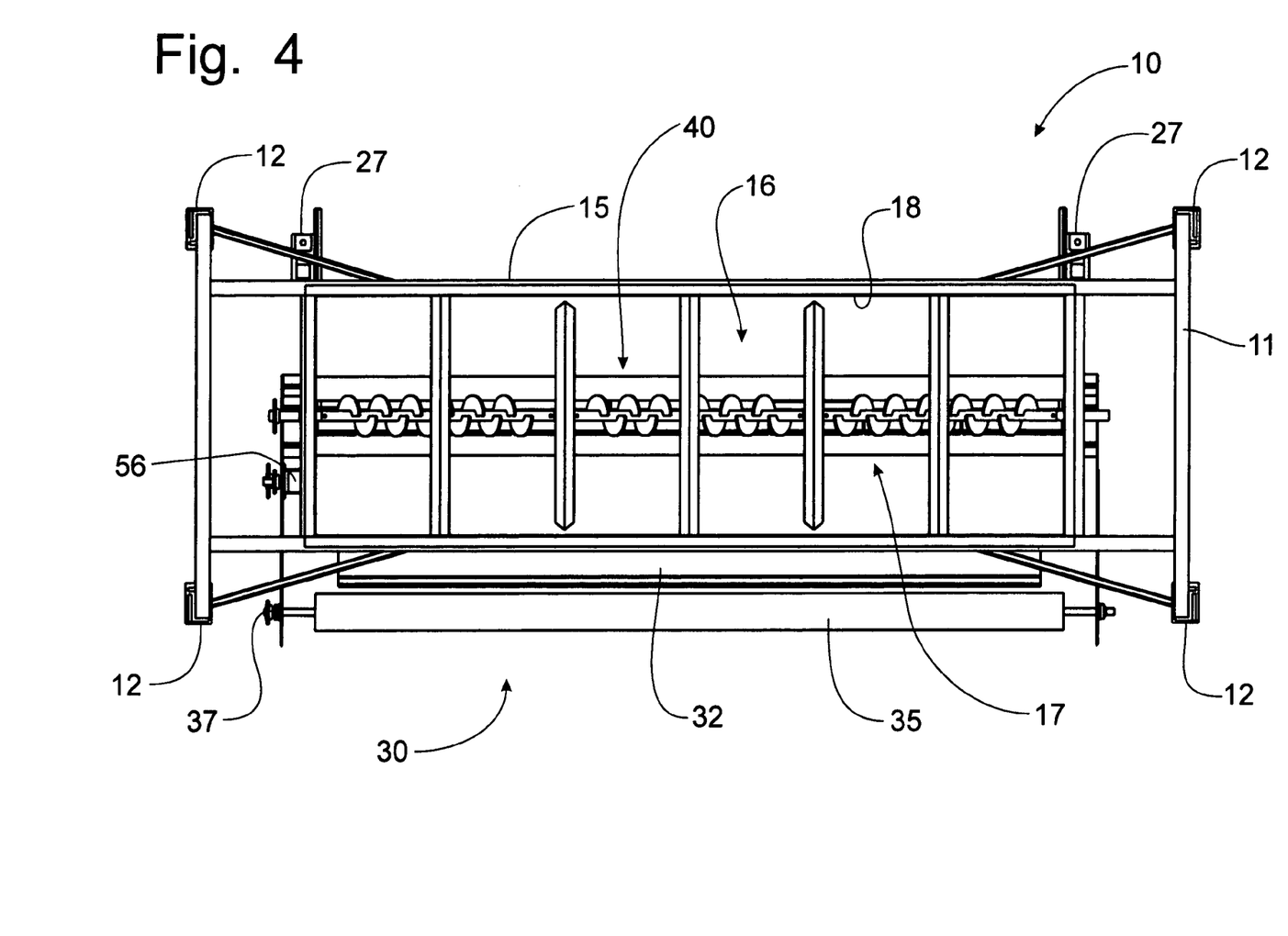
FIG. 4 is a top plan view of the concrete dispensing apparatus depicted in FIG. 1.
Figure 5:
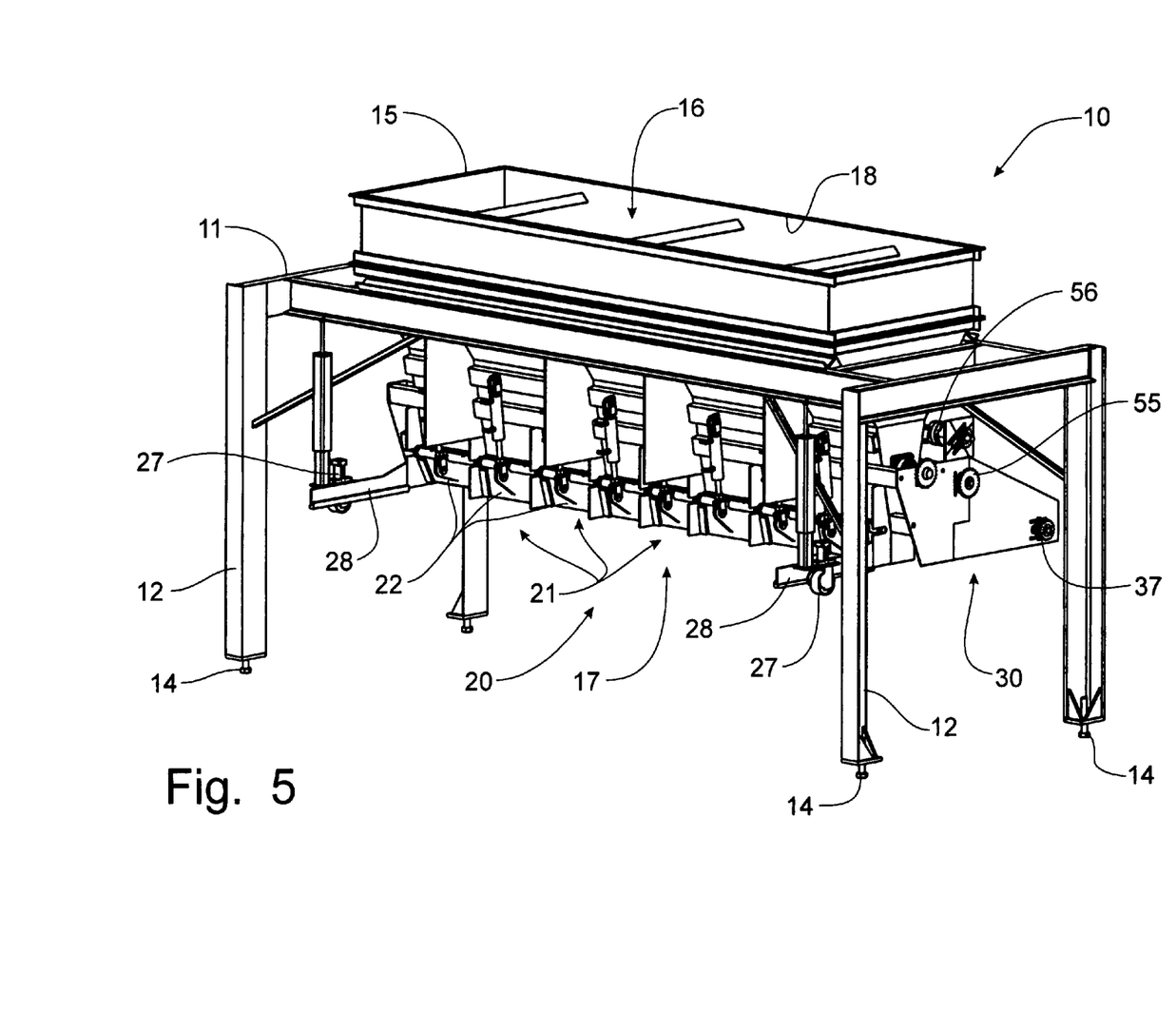
FIG. 5 is a front perspective view of the concrete dispensing apparatus shown in FIGS. 1-4.
Figure 6:
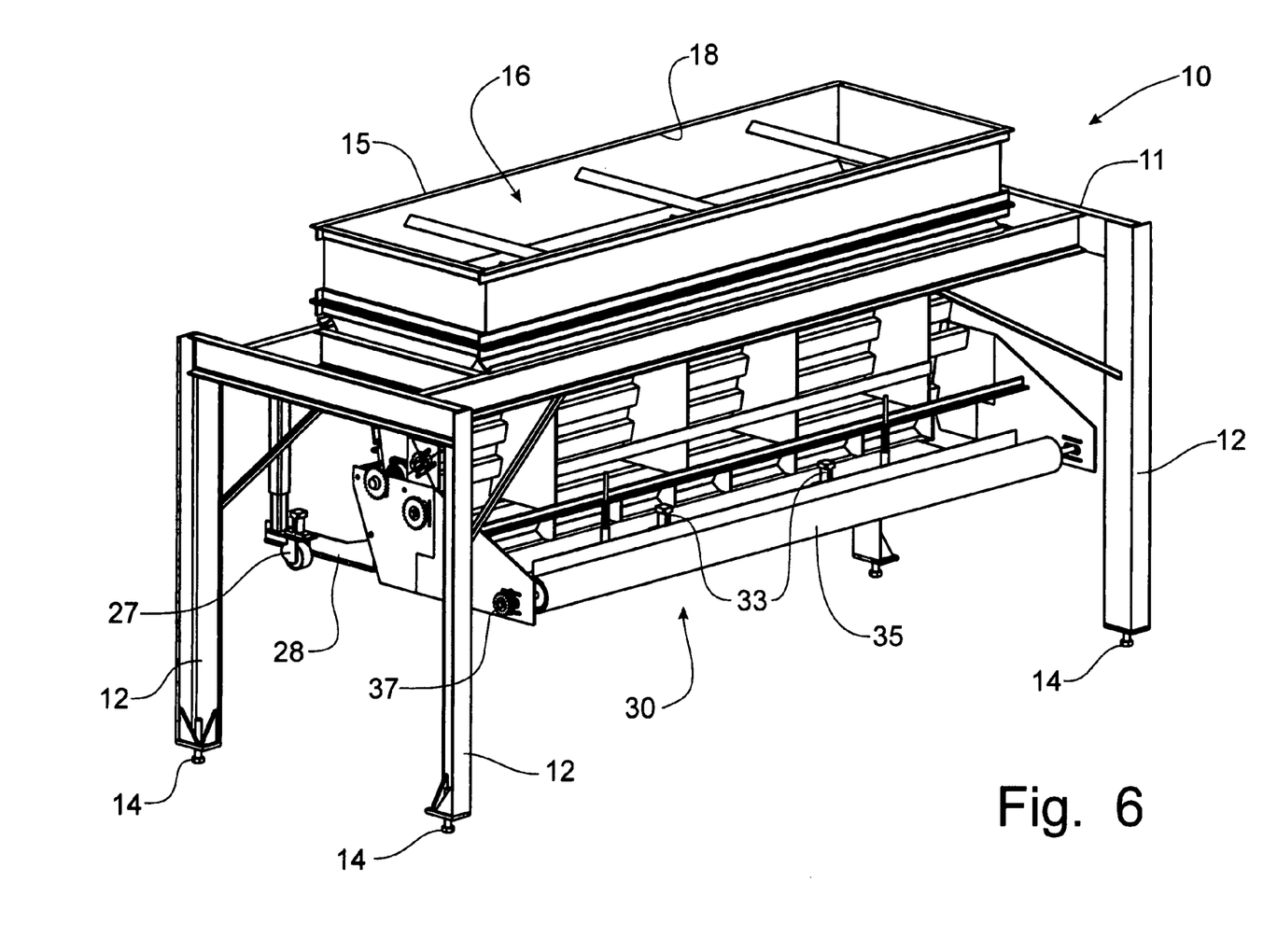
FIG. 6 is a rear perspective view of the concrete dispensing apparatus depicted in FIGS. 1-4.
Figure 7:
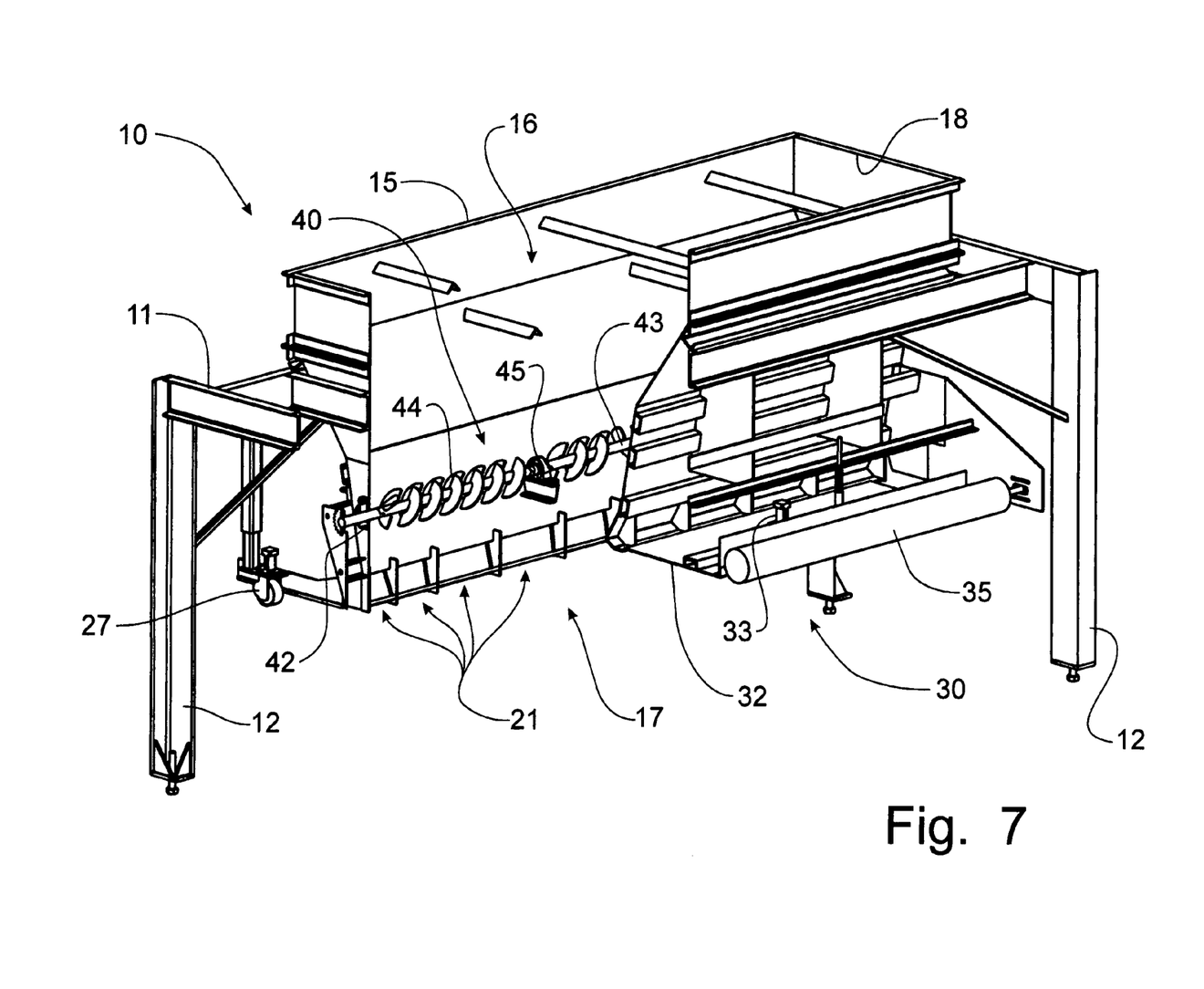
FIG. 7 is a rear perspective view of the concrete dispensing apparatus similar to that of FIG. 6, but having a portion thereof broken away to better view the auger mechanism located within the hopper.
Figure 8:
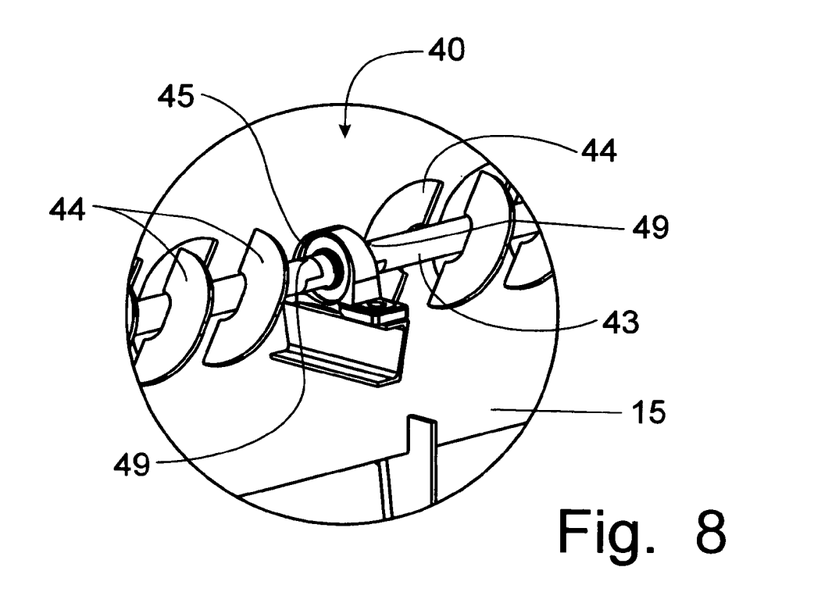
FIG. 8 is an enlarged detail view of the auger support joint within the hopper of the concrete dispensing apparatus corresponding to the circle 8 in FIG. 7.
Figures 9, 10:
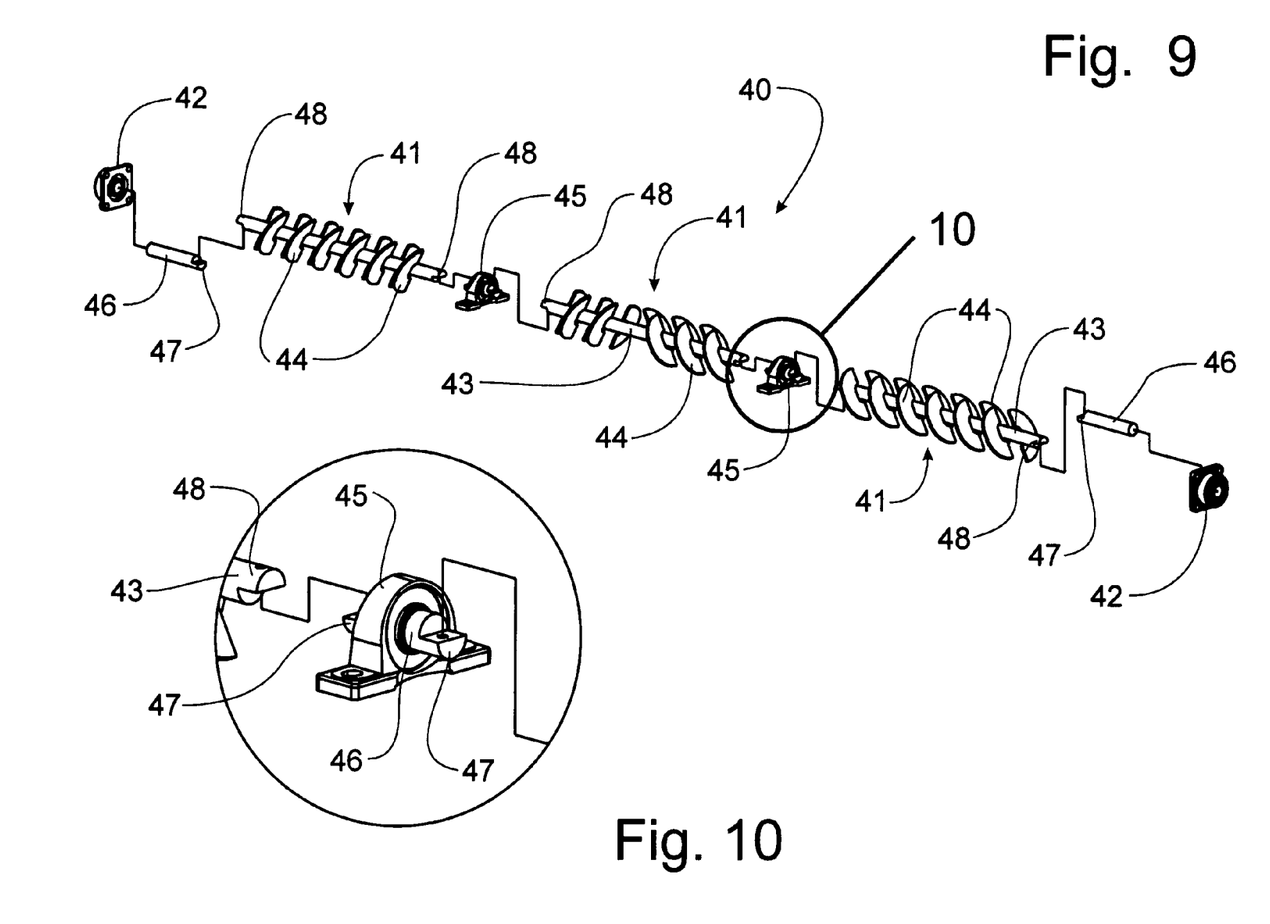
FIG. 9 is an exploded perspective view of the auger mechanism located within the hopper of the concrete dispensing apparatus.
FIG. 10 is an enlarged detail view of the bearing mount supporting the auger mechanism, corresponding to circle 10 in FIG. 9.

As best seen in FIGS. 4 and 7-10, an auger 40 is mounted internally of the cavity 16 of the hopper 15 extending from one transverse end wall of the hopper 15 to the other. The auger 40 serves to prevent bridging of the hydrated concrete mixture within the narrowing cavity 16 of the hopper 15, and to evenly distribute the concrete mixture across the transverse width of the ports of the discharge opening, which is particularly important as the cavity 16 is emptied of concrete mixture to be dispensed. The auger 40 is preferably formed in at least two segments 41, though preferably in three segments 41, with each segment being formed with a central shaft 43. An outer end bearing 42 supports each opposing end of the auger 40 at the end walls of the hopper 15. A covered sealed bearing 45 is positioned within the hopper 15 between each section. The auger 40 is preferably formed with interrupted (or segmented) auger flighting 44 welded to the central auger shaft 43 to convey concrete mixture within the hopper 15. Preferably, the flighting 44 is arranged to convey the concrete mixture toward or away from the center of the hopper 15, as is depicted in FIG. 9, depending on the direction of rotation of the auger shaft 43.

To enhance serviceability of the auger 40, each interior sealed bearing 45 and each outer end bearing 42 is provided with a jack shaft 46 fixed within the bearing 42, 45 and projecting outwardly thereof. Each respective opposing end of the jack shaft 46 is split along the axis of the jack shaft 46 to provide a half-round connector end 47. Each corresponding end of the auger shaft segment 43 mates with a jack shaft 46 and is also provided with a mating half-round end connecting portion 48. When assembled, the two half-round connectors 47, 48 overlie one another to permit a removable fastener 49, such as a shear bolt, to connect the auger segment shaft 43 to the jack shaft 46. Once assembled, the auger 40 is operable to rotate in either direction in unison across the entire transverse length of the hopper 15 to distribute the concrete mixture evenly across the discharge opening 17. If a section of the auger 40 becomes damaged or needs to be removed for servicing, the fastener connecting the central auger shaft 43 to the jack shaft 46 is removed and the individual auger segment 41 can be removed from the hopper 15 without disturbing the remaining auger segments 41.

The operative functions of the concrete dispenser 10 are preferably coupled in an operative manner to a hydraulic system 50 depicted schematically in FIG. 12. Hydraulic fluid is supplied under pressure from a tank (not shown) to a bank of electric solenoid valves 52 that is operable to control the flow of hydraulic fluid to each hydraulic cylinder 25 associated with the gate mechanism 20. The solenoid valves 52 are controlled through switches 62 mounted at the top of a control box 60, best seen in FIGS. 14 and 15. The hydraulic system 50 further includes a bank of solenoid valves 53 that are coupled with flow control valves 54 to control the operation of drive motors associated with the roller trowel 35, the auger 40 and the movable forms. Hydraulic fluid circulated to the hydraulic motor 55 drives the rotation of the roller trowel 35 through a chain drive (not shown) coupled to the sprocket 37 in a known manner. Similarly, the auger 40 is driven from the hydraulic motor 56 which is separately controlled from the other hydraulic components. Since the wall panel form (or in the alternative the concrete dispenser 10) has to be moved underneath the hopper 15, the drive mechanism (not shown) for moving the form (or in the alternative, moving the concrete dispenser 10 relative to the form) is powered through a hydraulic motor 57 controlled through the control box 60 so that the operation of the entire process can be effectively controlled by the operator from a single location. The form vibrators 27 and the screed vibrators 33 are preferably conventional vibratory drives powered through compressed air, although the vibrators 27, 33 could be hydraulically driven as well.

Figure 13:
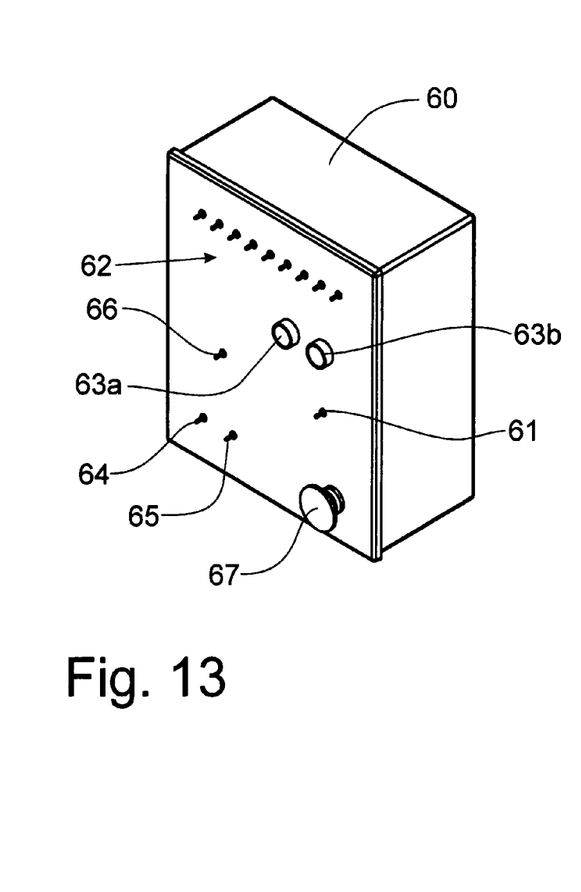
FIG. 13 is a perspective view of the control panel operatively connected to the hydraulic system for controlling the operation thereof.

As seen in FIG. 13, the control box 60 is provided with an array of toggle switches 62 at the top of the control box 62, with each respective switch being operable to control the extension and contraction of each respective hydraulic cylinder 25 associated with the gate mechanism 20. A pair of override switches 63a, 63b is preferably associated with the gate mechanism to cause all hydraulic cylinders 25 to extend to close all gates simultaneously (switch 63a) or to contract and open all gates simultaneously (switch 63b), regardless of the settings of the individual switches 62. The control box 60 is also provided with a main power switch 61 to activate or deactivate the control system. Separate switches are provided to control the forward and reverse functions of the auger (through toggle switch 64), the roller trowel (through toggle switch 65) and the track drive mechanism of the form (through toggle switch 66). An emergency stop button 67 is also provided to provide an instantaneous halt to all operations of the concrete dispenser 10 and associated mechanisms.

In operation, the concrete dispenser 10 is coupled operatively to an apparatus (not shown) for mixing and conveying an appropriate hydrated concrete mixture into the cavity 16 of the hopper 15. Such apparatus for mixing and conveying the hydrated concrete mixture is usually more efficiently operated when the concrete dispenser 10 is stationary. Thus, the preferred embodiment is to have the form move underneath a stationary concrete dispenser 10. The forms require a track mechanism (not shown) that is operable to move the form in a linear manner relative to the concrete dispenser 10. That track mechanism (not shown) is operatively coupled to the drive motor 66 controlled through the control box 60.

The transverse length of the hopper 15 and the discharge opening 17 at the bottom portion of the hopper 15 is substantially the same width as the wall panel form to be filled with the concrete mixture. The form vibrators 27 are positioned on the end members (not shown) of the forms to induce a vibrational movement into the forms to be transferred to the concrete mixture to be dispensed therein. Once the concrete dispenser 10 passes over the first side wall of the empty wall panel form to be positioned over the empty form, the operator hits the "All Open" override switch 63b to contract all of the hydraulic cylinders 25 and open all ports covering the entire discharge opening 17. The concrete mixture is then dispensed from the hopper 15 through all ports into the form. Assuming that this particular foundation wall panel is a solid panel with no window or door openings to be formed therein, the operator hits the "All Close" override switch 63a to extend all hydraulic cylinders and close each port of the discharge opening 17 when the concrete dispenser 10 reaches the opposing side wall of the form.

As the concrete dispenser 10 dispenses the concrete mixture into the wall panel form from one side wall to the other, the trailing finishing apparatus 30 works the top surface of the concrete mixture to level off the concrete mixture with the vibratory screed 32 and then smooth the top surface of the concrete mixture by the rotating roller trowel 35 trailing the screed 32. Since the concrete dispenser 10 is preferably stationary, the movement of the form below the hopper 15 allows the finishing apparatus 30 to provide a smooth, level surface from one end member of the form to the other and from one side wall of the form to the other.

In situations where a window or door opening, or some other wall feature in which no concrete is desired, is blocked out within the wall panel form, the operator will hit the "All Open" override switch 63b to initiate the flow of concrete mixture through all ports of the discharge opening 17, assuming that the respective opening is not positioned at the initial side wall of the wall panel form. When the discharge opening 17 approaches the opening in which no concrete mixture is desired, the operator flips the switch or switches 62 corresponding to the ports that overlie in whole or in part the opening to close the control gates 22 for those particular ports. Even ports that only partially overlie the opening are closed as no concrete mixture into the blocked out opening is desired. The operator may have to slow down the speed of operation of the track mechanism moving the form relative to the concrete dispenser 10, such as by momentarily halting the movement while concrete mixture continues to flow into the form, depending on the number of open ports through which concrete mixture is being delivered.

When the operator sees that the discharge opening 17 has cleared the blocked out opening, he can either hit the "All Open" override switch 63b again to open all control gates 22 or re-open each individual gates by manipulation of the switches 62 corresponding to the closed control gates 22. Where two openings in the form transversely overlap each other, the operator has the control to open and close each appropriate control gate 22 to continue the flow of concrete mixture into the form, except into the blocked out openings. With appropriate manipulation of the switches 64, 65 on the control box 60, the operator can also control the direction of operation of the internal auger 40 and the roller trowel 35. Rotational speed control can also be provided either through an appropriate control device (not shown) on the control box 60 or by manually changing the settings on the corresponding flow control valve 54. Forward and reverse operation of the auger 40 can dislodge an obstruction or help break up bridging, or to change the direction of flow of concrete mixture toward or away from the center of the hopper 15 so that the even distribution of the concrete mixture across the entire discharge opening can be maintained.

The auger mechanism 40 operates in a very harsh environment with the conveying of a hydrated concrete mixture formed from several abrasive components, including cement, sand and aggregate. Wear and tear on the auger 40 requires frequent servicing and repairs of the auger structure. Replacing a conventional auger requires the lateral shifting of the entire auger structure before being angled out of the hopper 15. With the segmented auger 40, each segment 41 of the auger 40 can be independently removed from the auger assembly 40 by disconnecting the segment shaft 43 from the mating jack shafts 46. However, if only a portion of the auger is damaged, that individual segment 41 can be removed and replaced with a new segment 41 to allow the concrete dispensing apparatus 10 to continue to operate while the damaged auger segment 41 is being repaired or serviced.

Disassembly of the auger 40 is accomplished by the removal of the fasteners connecting the half-round connecting portions 48 of the central auger shaft 43 from the mating half-round connecting portions 47 of the jack shafts 46 supported on the interior sealed bearings 45. By disconnecting appropriate fasteners, a single segment can be removed, or the entire auger mechanism 40 can be easily removed from the hopper 15. Furthermore, replacement of a failed interior bearing can be accomplished easily by removing the fasteners connecting the auger segment shaft 43 on both ends of the corresponding jack shaft 46 and then dismounting the interior bearing 45 from the hopper 15. The replacement interior bearing 45 can then be quickly re-connected to the auger shaft 43 by reinstalling the fasteners to mated connecting portions 47, 48.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An auger assembly operable within a hopper having a hopper length dimension, said auger assembly comprising:
   at least two auger segments, each auger segment including a shaft defining a central axis of said auger segment and fighting affixed to said shaft to convey material engaged by said fighting along said central axis when said shaft is rotated, said shaft have an end formed with a half round connection portion, each said auger segment having a segment length dimension that is less than said hopper length dimension;
   at least one interior bearing mounted to a support structure and having a jack shaft rotatably supported by said interior bearing, said jack shaft extending outwardly from each side of said interior bearing and having opposing half round connection ends configured in a mating relationship with said half round connection portion of said auger segment located on opposing sides of said interior bearing, the summation of the segment length dimensions being substantially equal to said hopper length dimension, said jack shaft and said auger shafts being aligned;
   a fastener connecting each said half-round connection end to a corresponding half round connection portion on the corresponding said auger segment shaft; and
   a pair of outer end bearings mounted on said support structure and rotatably receiving the shaft of the corresponding said auger segment.

2. The auger assembly of claim 1 further comprising at least three auger segments and at least two interior bearings, said at least three auger segments including first and second end segments having said shaft supported by a corresponding one of said outer bearings and having one of said half round connection portions connectable to a corresponding one of said interior bearings, said at least three auger segments further including at least one interior auger segment having a half round connection portion on each opposing end of said central shaft connected to opposing interior bearings.

3. The auger assembly of claim 2 wherein each said auger segment is independently removable from said auger assembly without requiring disassembly of the remaining auger segments.

4. The auger assembly of claim 3 wherein each said interior bearing is independently removable from said auger assembly by the disconnection of each said auger segment connected thereto.

5. The auger assembly of claim 1 wherein said fighting is segmented.

6. The auger assembly of claim 5 wherein said fighting is oriented to convey material from each respective end of said auger assembly toward a center point of said auger assembly.

7. A concrete dispensing apparatus for distributing a hydrated concrete mixture into a form for the manufacture of a pre-cast concrete structure comprising:
- a hopper supported by said frame above said form to dispense said concrete mixture into the form, said hopper having upright walls defining a cavity including an upper inlet opening into which said concrete mixture is loaded into said hopper cavity and a lower discharge opening through which said concrete mixture is dispensed from said hopper into said form said hopper having a hopper length dimension extending between opposing end walls of said hopper; and
- an auger assembly mounted in said hopper cavity between said opposing end walls of said hopper, said auger assembly being formed in a plurality of auger segments with each said auger segment having a segment length dimension less than said hopper length dimension with each said auger segment being removable from said hopper independently of the other said auger segments.

8. The concrete dispensing apparatus of claim 7 wherein each said auger segment includes:
- a shaft defining a central axis of said auger segment and fighting affixed to said shaft to convey material engaged by said fighting along said central axis when said shaft is rotated, said shaft have an end formed with a half-round connection portion.

9. The concrete dispensing apparatus of claim 8 wherein said auger assembly further comprises:
- an interior bearing mounted in said hopper cavity and having a jack shaft rotatably supported by said interior bearing, said jack shaft extending outwardly from each side of said interior bearing and having opposing half-round connection ends configured in a mating relationship with said half round connection portion of corresponding said auger segments mounted on opposing sides of said interior bearing, said jack shaft and said connected auger shafts being aligned.

10. The auger assembly of claim 9 wherein said auger assembly further comprises:
- a fastener connecting each said half-round connection end to a corresponding half round connection portion on said auger segment shaft; and
- a pair of outer end bearings mounted on said opposing end walls of said hopper and rotatably receiving the shaft of a corresponding auger segment.

11. The concrete dispensing apparatus of claim 10 wherein said discharge opening being divided into a plurality of ports, each said port being associated with a control gate mounted on said hopper at said discharge opening to be independently movable between a closed position in which said control gate covers the corresponding said port to prevent said concrete mixture from being dispensed therethrough and an open position in which said concrete mixture is permitted to flow through the corresponding said port, each said control gate including an actuator for affecting said movement between said open and closed positions.

12. The concrete dispensing apparatus of claim 11 wherein said auger assembly is positioned above said discharge opening and rotatable in opposing directions to be operable to distribute said concrete mixture across said ports.

13. The concrete dispensing apparatus of claim 12 wherein said auger assembly includes at least three auger segments and at least two interior bearings, said at least three auger segments including first and second end segments having said shaft supported by a corresponding one of said outer bearings and having one of said half-round connection portions connectable to a corresponding one of said interior bearings, said at least three auger segments further including at least one interior auger segment having a half-round connection portion on each opposing end of said central shaft connected to opposing interior bearings.

14. The concrete dispensing apparatus of claim 13 wherein said fighting is segmented.

15. The concrete dispensing apparatus of claim 14 wherein said fighting is oriented to convey material from each respective end of said auger assembly toward a center point of said auger assembly.

16. In a concrete dispensing apparatus for distributing a hydrated concrete mixture into a form for the manufacture of a pre-cast concrete structure, the improvement comprising:
- a hopper supported by said frame above said form to dispense said concrete mixture into the form, said hopper having upright end walls and transverse walls defining a cavity including an upper inlet opening into which said concrete mixture is loaded into said hopper cavity and a lower discharge opening through which said concrete mixture is dispensed from said hopper into said form, said lower discharge opening being divided into a plurality of ports, each said port being associated with a control gate mounted on said hopper at said discharge opening to be independently movable between a closed position in which said control gate covers the corresponding said port to prevent said concrete mixture from being dispensed therethrough and an open position in which said concrete mixture is permitted to flow through the corresponding said port, each said control gate including an actuator for affecting said movement between said open and closed positions; and
- an auger assembly mounted in said hopper cavity between opposing end walls of said hopper, said auger assembly being formed in a plurality of auger segments with each said auger segment being removable from said hopper independently of the other said auger segments and including at least one interior bearing mounted within said hopper cavity, each said interior bearing including a jack shaft projecting laterally from opposing sides of each said interior bearing so as to be detachably connected to a corresponding end of one of said auger segments on each opposing side of each said interior bearing for rotatable support thereof such that each said auger segment can be removed from said hopper independently of each other said auger segment.

17. The concrete dispensing apparatus of claim 16 wherein each said jack shaft has opposing half-round connection ends configured in a mating relationship with a half-round connection portion of formed on each said auger segment.

18. The concrete dispensing apparatus of claim 17 wherein a fastener connects each said half-round connection end to a corresponding half-round connection portion of said auger segment.

19. The concrete dispensing apparatus of claim 18 wherein each said auger segment comprises:
- a shaft defining a central axis of said auger segment and segmented fighting affixed to said shaft to convey material engaged by said segmented fighting along said central axis when said shaft is rotated, said shaft have an end formed with said half-round connection portion.

20. The concrete dispensing apparatus of claim 19 wherein said fighting is oriented to convey material from each respective end of said auger assembly toward a center point of said auger assembly.

* * * * *